(12) United States Patent
Howe et al.

(10) Patent No.: US 10,381,617 B2
(45) Date of Patent: Aug. 13, 2019

(54) POLYMERIC BATTERY FRAMES AND BATTERY PACKS INCORPORATING THE SAME

(71) Applicant: GM GLOBAL TECHNOLOGY OPERATIONS LLC, Detroit, MI (US)

(72) Inventors: Timothy J. Howe, Royal Oak, MI (US); Sami A. Syed, Windsor (CA); Roger M. Brisbane, Washington, MI (US); Nicholas Compton, Freeland, MI (US); Igor M. Kan, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 15/718,166

(22) Filed: Sep. 28, 2017

(65) Prior Publication Data
US 2019/0097189 A1 Mar. 28, 2019

(51) Int. Cl.
*H01M 2/10* (2006.01)
*H01M 10/613* (2014.01)
*H01M 10/625* (2014.01)
*H01M 10/6555* (2014.01)

(52) U.S. Cl.
CPC ....... *H01M 2/1077* (2013.01); *H01M 10/613* (2015.04); *H01M 10/625* (2015.04); *H01M 10/6555* (2015.04); *H01M 2220/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,141,616 B2 * | 11/2018 | Buck | ................ | H01M 2/024 |
| 2003/0072997 A1 * | 4/2003 | Estreich | ............. | H01M 2/0242 429/153 |
| 2004/0018415 A1 * | 1/2004 | Lai | ..................... | H01M 4/8605 429/483 |
| 2005/0089750 A1 * | 4/2005 | Ng | ..................... | H01M 2/0242 429/120 |
| 2005/0233186 A1 * | 10/2005 | Ryoichi | ............ | H01M 8/04223 429/432 |
| 2007/0240299 A1 * | 10/2007 | Hasei | ................. | H01M 4/0404 29/623.5 |
| 2009/0092878 A1 * | 4/2009 | Seido | ................. | H01M 8/0232 429/492 |

(Continued)

*Primary Examiner* — Kaity V Chandler

(57) ABSTRACT

Provided herein are battery packs comprising a first polymeric endplate, a second polymeric endplate, and a plurality (n) of partitions extending between the first endplate and second endplate and defining (n−1) battery cavities. Each cavity is capable of receiving a battery cell stack comprising a plurality of battery cells and optionally cooling plates and foam pads. Partitions comprise a plurality of polymeric repeating spacers, and each spacer from each partition can correspond to a cooling plate common to a plurality of battery cell stacks. Each of the repeating spacers and cooling plates can include a plurality of aligned apertures, and corresponding bolts can occupy the aligned apertures and secure the same to the endplates. Each repeating spacer can correspond to a complete or partial battery unit, wherein a complete battery unit comprises a first battery cell, a cooling plate, a second battery cell, and a foam pad.

11 Claims, 6 Drawing Sheets

(56) References Cited

U.S. PATENT DOCUMENTS

| | | | | |
|---|---|---|---|---|
| 2009/0104505 A1* | 4/2009 | Chang | H01M 8/0247 | 429/460 |
| 2009/0239130 A1* | 9/2009 | Culver | H01M 2/206 | 429/50 |
| 2010/0003578 A1* | 1/2010 | Wahl | H01M 2/1094 | 429/493 |
| 2010/0233566 A1* | 9/2010 | Sato | H01M 8/006 | 429/469 |
| 2010/0247996 A1* | 9/2010 | Ijaz | H01M 10/0468 | 429/120 |
| 2010/0255351 A1* | 10/2010 | Ijaz | H01M 2/1077 | 429/7 |
| 2011/0146064 A1* | 6/2011 | Feaver | H01M 2/1673 | 29/623.2 |
| 2013/0157099 A1* | 6/2013 | Anderson | H01M 2/1077 | 429/120 |
| 2013/0202077 A1* | 8/2013 | Walton | G21C 3/352 | 376/442 |
| 2016/0329538 A1* | 11/2016 | Hughes | H01M 2/0242 | |
| 2018/0013113 A1* | 1/2018 | Wuensche | H01M 2/1077 | |

* cited by examiner

POLYMERIC BATTERY FRAMES AND BATTERY PACKS INCORPORATING THE SAME

BACKGROUND

Various batteries, including lithium-ion, lead acid and nickel-metal hydride variants, may be configured to supplement or supplant conventional internal combustion engines (ICEs) for automotive and related transportation applications. The ability to passively store energy from stationary and portable sources, as well as from recaptured kinetic energy provided by the vehicle and its components, makes batteries (in general) and rechargeable batteries (in particular) ideal to serve as part of a propulsion system for cars, trucks, buses, motorcycles and related vehicular platforms. In one form suitable for automotive applications, the batteries are shaped as a generally thin rectangular cell with positive and negative voltage terminals emanating therefrom; several such batteries may typically be combined into larger assemblies—including modules that in turn can be formed into a complete system known as a battery pack—to generate the desired power output.

BRIEF SUMMARY OF THE INVENTION

A battery section frame is provided, and includes a first polymeric endplate, a second polymeric endplate, and a plurality (n) of polymeric planar partitions extending between the first endplate and second endplate and defining (n−1) prismatic battery cavities. Each cavity is capable of receiving a plurality of stacked battery cells. The plurality of planar partitions each can be a plurality of polymeric repeating spacers. The battery section frame can further include at least one bolt corresponding to each of the plurality of repeating spacers, wherein each of the bolts can maintain the first endplate, the second endplate, and the corresponding plurality of repeating spacers in a substantially fixed orientation. The battery section frame can further include a plurality of cooling plates, wherein each polymeric repeating spacer of each planar partition corresponds to a cooling plate, and wherein each cooling plate extends through a plurality of prismatic battery cavities. The battery section frame can further include a plurality of bolts, wherein the bolts secure the polymeric repeating spacers of each planar partition and the cooling plates to the first polymeric endplate and the second polymeric endplate via aligned apertures in each of the repeating spacers and cooling plates. The first polymeric endplate, the second polymeric endplate, and the plurality of polymeric planar partitions can be made of polyphthalamide, polyarylamide, Poly[imino(1,6-dioxohexamethylene) iminohexamethylene], or poly(hexano-6-lactam). The first polymeric endplate, the second polymeric endplate, and the plurality of polymeric planar partitions can be made of polyphthalamide, polyarylamide, poly[imino(1,6-dioxohexamethylene) iminohexamethylene], poly(hexano-6-lactam), polyphthalamide, polyarylamide, poly[imino(1,6-dioxohexamethylene) iminohexamethylene], poly(hexano-6-lactam), acrylonitrile butadiene styrene, polymethyl methacrylate, one or more cycloolefin copolymers, one or more liquid crystal polymers, polyoxymethylene, one or more polyacrylates, polyacrylonitrile, one or more polyamide-imides, one or more polyaryletherketones (e.g., polyetheretherketone, polyetherketoneketone), polybutadiene, polybutylene, polybutylene terephthalate, one or more chlorofluoropolymers (e.g., polychlorotrifluoroethylene), polyethylene terephthalate, polycyclohexylene dimethylene terephthalate, one or more polycarbonates, one or more polyhydroxyalkanoates, one or more polyketones, polyetherimide, one or more polysulfones, one or more polyimides, polyphenylene oxide, polyphenylene sulfide, polypropylene, and/or polyethylene. The first polymeric endplate, the second polymeric endplate, and the plurality of polymeric planar partitions can be made of a reinforced polymer.

A battery pack is provided and includes a first polymeric endplate, a second polymeric endplate substantially planar with the first endplate, a first polymeric planar partition attaching proximate the first end of the first endplate and the first end of the second endplate, a second polymeric planar partition attaching proximate the second end of the first endplate and the second end of the second endplate, one or more polymeric middle planar partitions attaching to the first endplate and the second endplate between the first polymeric planar partition and the second polymeric planar partition, wherein the first planar partition, the second planar partition, and the plurality of middle planar partitions define a plurality of prismatic battery cavities, and a plurality of battery cell stacks comprising a plurality of battery cells, each stack occupying one of the prismatic battery cavities. Each of the battery cell stacks are disposed substantially planar with the first endplate and the second endplate. Each battery cell stack can further include one or more cooling plates and/or foam pads disposed between adjacent battery cells. One or more cooling plates of a plurality of battery cell stacks can be a single common cooling plate. The plurality of polymeric planar partitions can each be a plurality of polymeric repeating spacers. The repeating spacers can interlock with one or more adjacent repeating spacers, the first endplate, and/or the second endplate. The battery pack can further include at least one bolt corresponding to each of the plurality of repeating spacers, wherein each of the bolts can maintain the first endplate, the second endplate, and the corresponding spacers in a substantially fixed orientation. Each of the repeating spacers of a planar partition can include a plurality of aligned apertures, and a plurality of corresponding bolts can occupy the aligned apertures and secure the repeating spacers to the first endplate and the second endplate. Each of the plurality of polymeric repeating spacers can correspond to a complete or partial battery unit, wherein a complete battery unit includes an ordered stack of a first battery cell, a cooling plate, a second battery cell, and a foam pad. The first polymeric endplate, the second polymeric endplate, and the plurality of polymeric planar partitions can be made of polyphthalamide, polyarylamide, Poly[imino(1,6-dioxohexamethylene) iminohexamethylene], or poly(hexano-6-lactam). The first polymeric endplate, the second polymeric endplate, and the plurality of polymeric planar partitions can be made of polyphthalamide, polyarylamide, poly[imino(1,6-dioxohexamethylene) iminohexamethylene], poly(hexano-6-lactam), polyphthalamide, polyarylamide, poly[imino(1,6-dioxohexamethylene) iminohexamethylene], poly(hexano-6-lactam), acrylonitrile butadiene styrene, polymethyl methacrylate, one or more cycloolefin copolymers, one or more liquid crystal polymers, polyoxymethylene, one or more polyacrylates, polyacrylonitrile, one or more polyamide-imides, one or more polyaryletherketones (e.g., polyetheretherketone, polyetherketoneketone), polybutadiene, polybutylene, polybutylene terephthalate, one or more chlorofluoropolymers (e.g., polychlorotrifluoroethylene), polyethylene terephthalate, polycyclohexylene dimethylene terephthalate, one or more polycarbonates, one or more polyhydroxyalkanoates, one or more polyketones, polyetherimide, one or more polysulfones, one or more polyimides, polyphenylene oxide, polyphenylene sulfide, polypropylene, and/or polyethylene. The first polymeric endplate, the second polymeric endplate, and the plurality of polymeric planar partitions can be made of a polyamide material. The first polymeric endplate, the second polymeric endplate, and the plurality of polymeric planar partitions can be made of a polymer reinforced with one or more of glass fiber, carbon fiber, or resin. The battery pack can power a vehicle.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
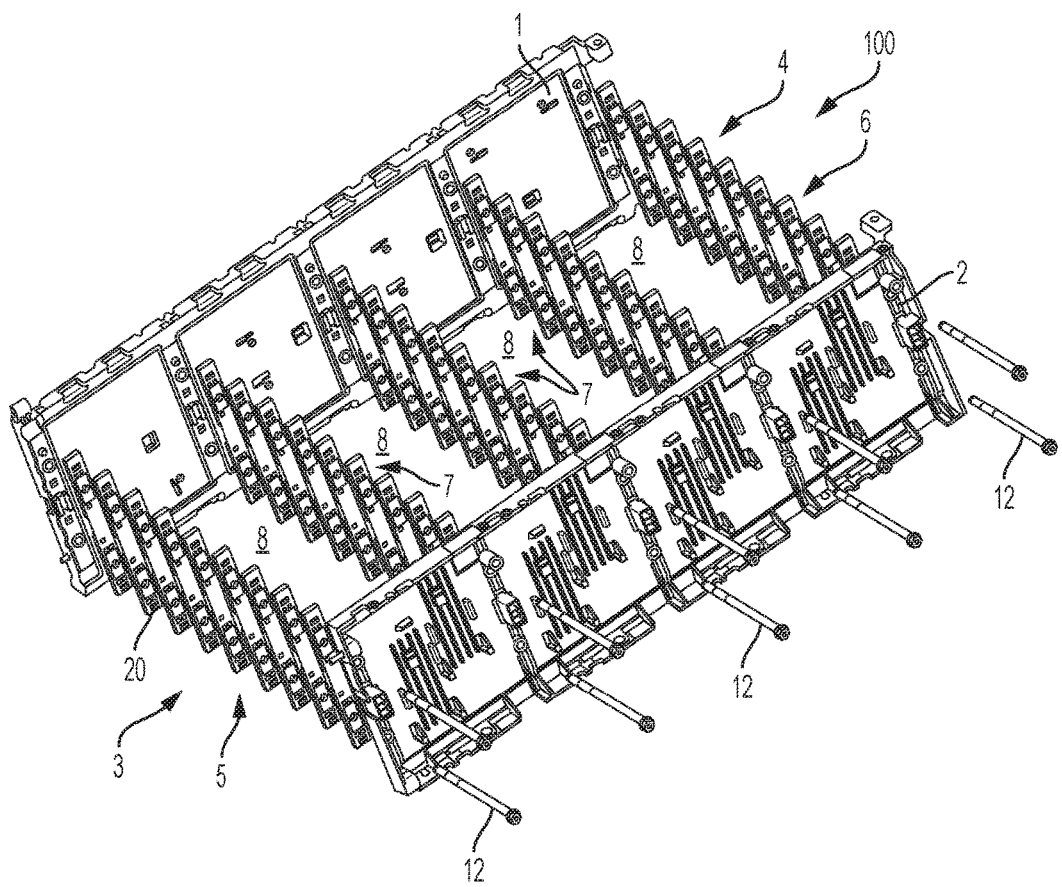
FIG. 1 illustrates a perspective exploded view of a battery section frame, according to one or more embodiments.
Figure 2:
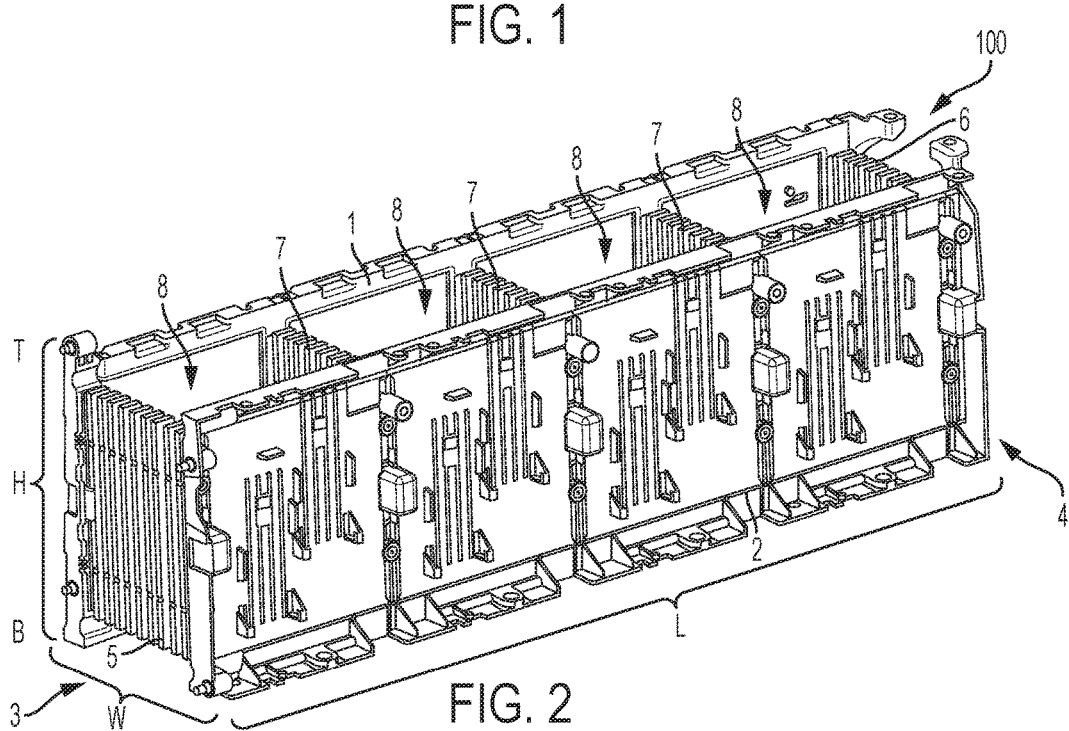
FIG. 2 illustrates a perspective view of a battery section frame, according to one or more embodiments.

FIG. 1 illustrates a perspective exploded view of a battery section frame 100 and FIG. 2 illustrates a perspective view of a battery section frame 100. Battery section frame 100 includes a first endplate 1 and a second endplate 2 extending between a first end 3 and a second end 4 of battery section frame 100. First endplate 1 and second endplate 2 can be polymeric, as will be described below. A plurality of planar partitions extend between first endplate 1 and second endplate 2. Specifically, battery section frame 100 can comprises a first planar partition 5 attached proximate to and extending between the first end 3 of first endplate 1 and second endplate 2, and a second planar partition 6 attached proximate to and extending between the second end 4 of first endplate 1 and second endplate 2. Battery section frame 100 may further include one or more middle planar partitions 7 attached to and extending between first endplate 1 and second endplate 2. Middle planar partitions 7 are generally planar with and disposed between first planar partition 5 and second planar partition 6. Collectively, the plurality (n) of planar partitions (e.g., first planar partition 5, second planar partition 6, and optionally one or more middle planar partitions 7) define (n−1) battery cavities 8. The endplates 1,2 can be substantially planar to one another, and planar partitions can be disposed in generally perpendicular orientations thereto. Accordingly the one or more battery cavities 8 may be substantially prismatic. Length L, width W and height H of the first endplate 1 and second endplate 2, and accordingly battery section frame 100, are illustratively defined in FIG. 2 to provide a frame of reference when describing appurtenant components below. Height H generally defines a top T and a bottom B.

Figure 3A:
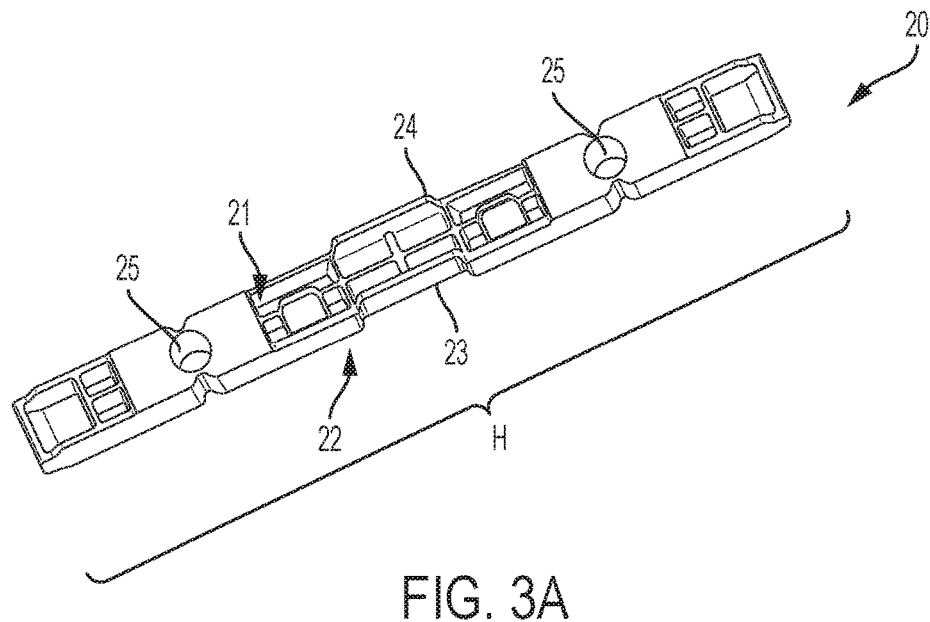
FIG. 3A illustrates a perspective view of a repeating spacer, according to one or more embodiments.
Figure 3B:
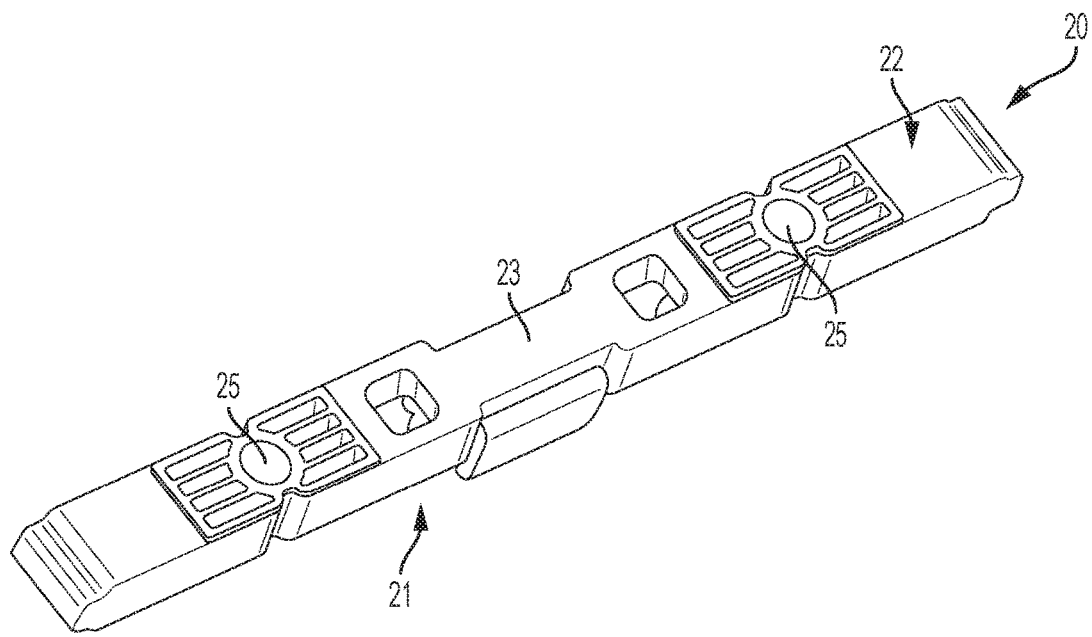
FIG. 3B illustrates a perspective view of a repeating spacer, according to one or more embodiments.
Figure 4:
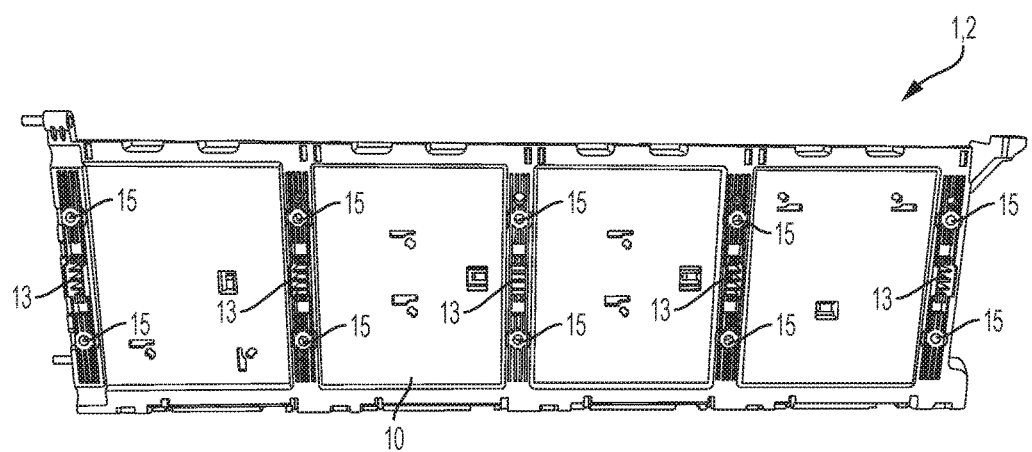
FIG. 4 illustrates a perspective view of an inner face of an endplate, according to one or more embodiments.
Figure 5:
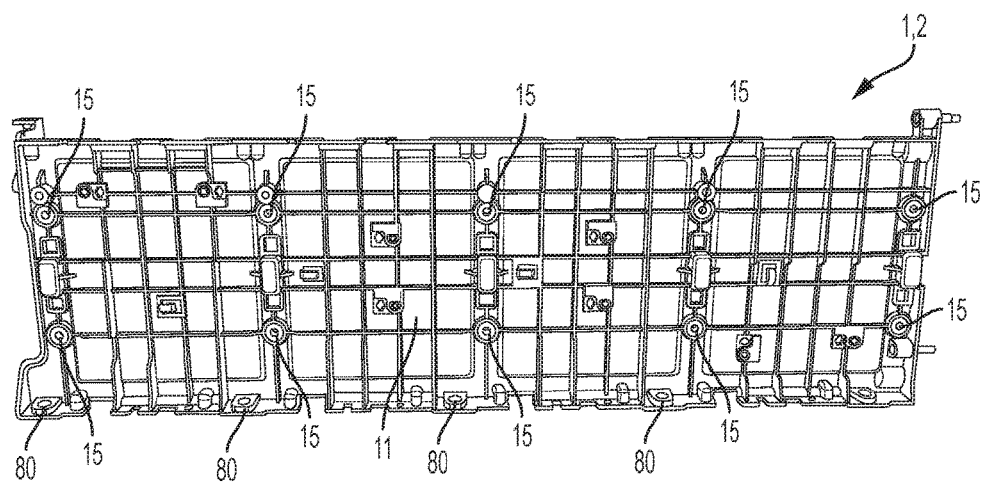
FIG. 5 illustrates a perspective view of an outer face of an endplate, according to one or more embodiments.

The plurality of planar partitions can each comprise a plurality of repeating spacers 20, as shown in FIG. 1. The plurality of repeating spacers 20 can be polymeric, as will be described below. FIGS. 3A-B illustrate perspective views of a repeating spacer 20. Repeating spacer 20 is shown as generally rectilinear, although other geometric configurations are practicable, and is defined by a first face 21 and a second face 22. A plurality of repeating spacers 20 can include interlocking features, such as indentation 23 and protrusion 24, for interlocking/mating with other repeating spacers 20, first endplate 1, and/or second endplate 2. FIGS. 4-5 illustrate the inner face 10 and outer face 11, respectively, of an endplate, such as first endplate 1 or second endplate 2. The polymeric nature of first endplate 1 and second endplate 2 accommodate the inclusion of cell sensing attachment features at any location. As shown in FIG. 4, first endplate 1 and/or second endplate 2 can comprise interlocking features 13 configured to interact with the interlocking features (e.g., indentation 23, protrusion 24) of repeating spacers 20. Interlocking features 13 can comprise compression joints, for example. Similarly, the indentations 23 and protrusions 24 of repeating spacers can comprise compression joints. The repeating spacers 20, first endplate 1, and second endplate 2 can be maintained in a substantially fixed orientation (e.g., as shown in FIG. 2) via bolts 12. For example, at least one bolt 12 can correspond to a plurality of repeating spacers 20 that form a common planar partition. In the non-limiting example as shown in FIG. 1, two bolts 12 correspond to first planar partition 5, and secure the same to first endplate 1 and second endplate 2. In cooperation with such features, each repeating spacer 20 can comprise one or more apertures 25 which align with the apertures 25 of other repeating spacers 20 of a common planar partition. A set of aligned apertures 25 can receive a bolt 12; said bolt 12 can further occupy an aligned aperture 15 of first endplate 1 and/or second endplate 2. As illustrated, each planar partition (e.g., a plurality of repeating spacers 20) corresponds and/or is capable of receiving two bolts 12, although planar partitions may correspond to a single bolt 12, or three or more bolts 12. Similarly, first endplate 1 and second endplate 2 may facilitate the use of any number of bolts by comprising the requisite number of apertures 15.

Figure 6:
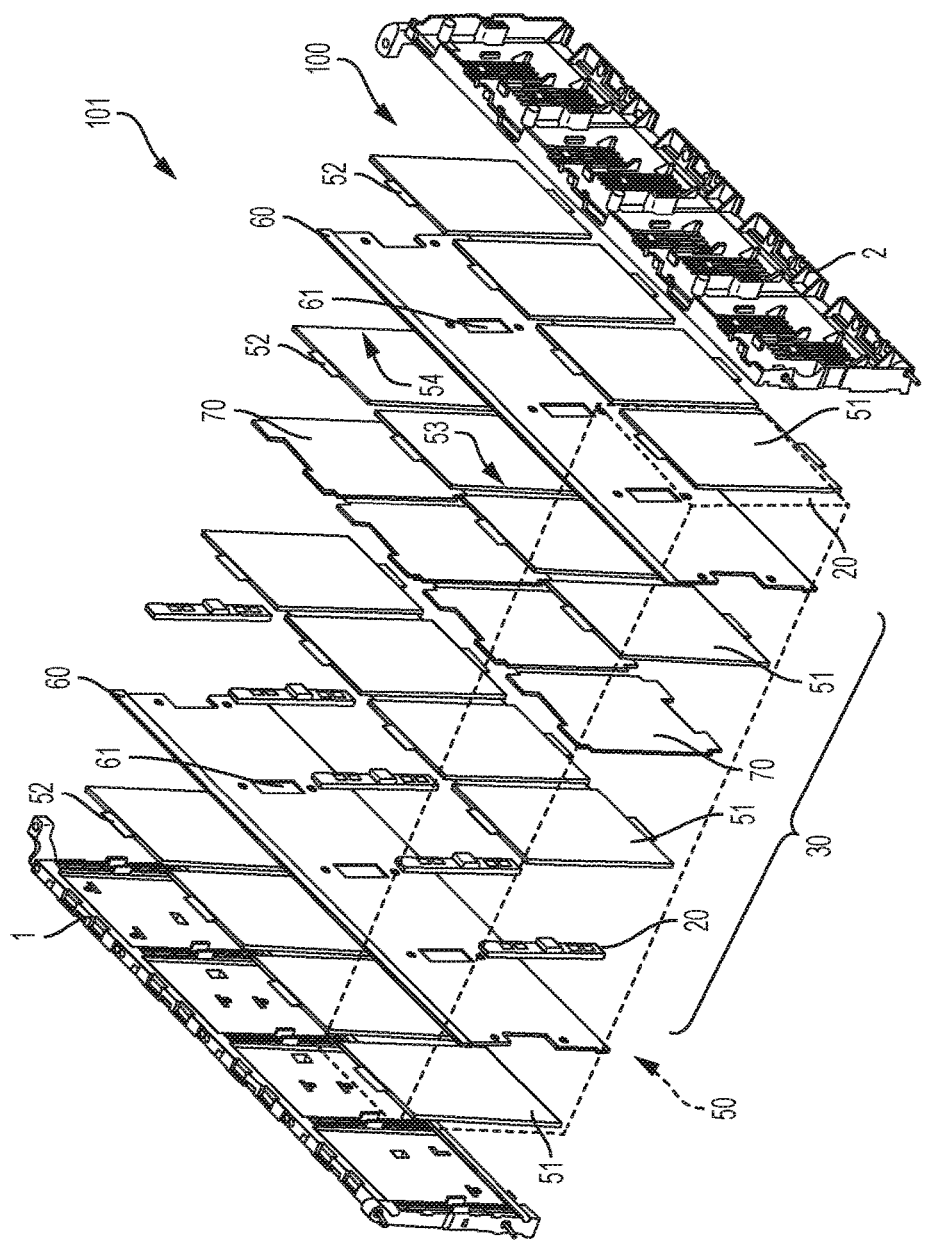
FIG. 6 illustrates an exploded view of a battery section, according to one or more embodiments.

Each of the battery cavities 8 can receive and retain a plurality of stacked battery cells. FIG. 6 illustrates an exploded view of a battery section 101 comprising battery section frame 100 (bolts 12 omitted for clarity), and a plurality of battery stacks 50. Battery section 101 is illustrated as comprising four battery stacks 50 arranged lengthwise within battery section frame 100, although battery section 101 can comprise fewer or more battery stacks 50 as desired. Each battery stack 50 comprises a plurality of battery cells 51 stacked in a substantially planar orientation relative to each other and to first endplate 1 and second endplate 2. Each battery cell 51 can interact with/couple to a repeating spacer 20 on a first side 53 and a second side 54. Interlocking features of a battery 51 and/or repeating spacer 20 can serve to maintain a battery cell 51 in a desired position within battery section 101. A single repeating spacer 20 may interact with/couple to a plurality of battery cells 51; for example, as shown in FIG. 6, a repeating spacer 20 can interact with/couple to two battery cells 51. Each battery cell 51 can comprises one or more cell tabs 52 (e.g., one or more anode cell tabs and one or more cathode cell tabs), wherein the cell tabs protrude height-wise beyond the general height dimensions of the battery cell 51.

Figure 7:
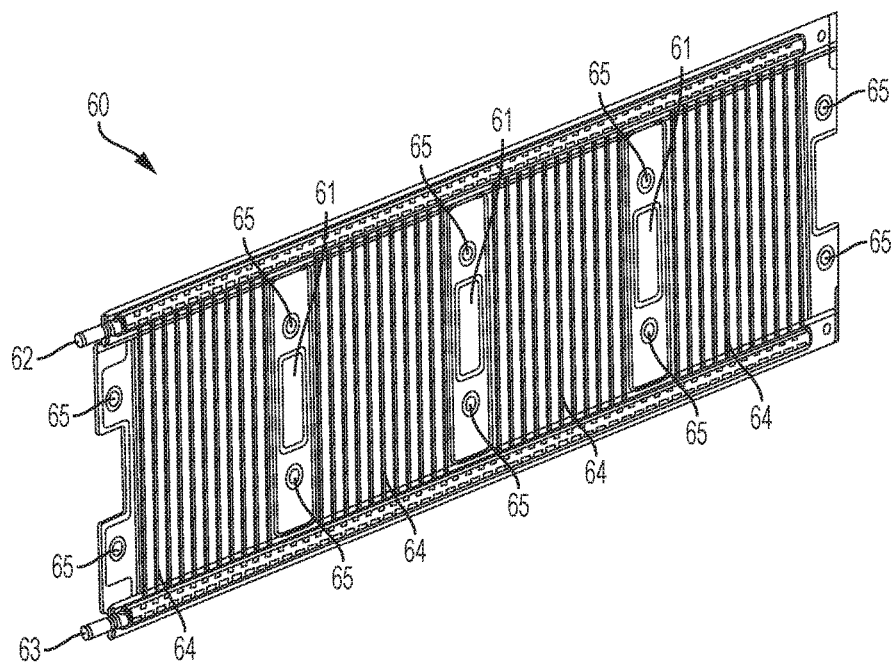
FIG. 7 illustrates a perspective view of a cooling plate, according to one or more embodiments.

Each battery stack 50 can further comprise one or more cooling plates 60 disposed between adjacent battery cells 51. Cooling plates 60 serve to transfer heat away from battery cells 51, and may be disposed contiguous with or proximate to one or more battery cells 51. In some embodiments, a cooling plate 60 may be exclusive to a battery stack 50. Alternatively, as shown, a cooling plate 60 can be common to a plurality of battery stacks 50. A perspective view of a common cooling plate 60 is illustrated in FIG. 7. Cooling plate 60 can comprise one or more spacer apertures 61 capable of interacting with/coupling to a repeating spacer 20. Such spacer apertures 61 can serve to maintain cooling plate 60 in a desired position. Cooling plate 60 can comprise a plurality of apertures 65 which can align with the apertures 25 of repeating spacers 20 of a common planar partition and accordingly maintain cooling plate 60 in a desired position relative to first endplate 1, second endplate 2, and repeating spacers 20. Cooling plate 60 includes a coolant supply line 62 running generally across its top edge and a coolant return line 63 running generally across its bottom edge. In some embodiments the top-bottom orientation of supply line 62 and return line 63 may be reversed. Coolant from a source (not shown) is communicated to supply line 62 and a plurality of cooling channels 64 communicate the same to return line 63. Return line 63 can communicate coolant back to the coolant source, or a pumping circuit, for example. Cooling channels 64 direct heat away from one or more proximate battery cells 51 via the coolant flowing therein. As shown, 11 cooling channels 64 correspond to a particular battery cavity 8, but it is practicable to use more or less cooling channels 64 as desired. Cooling channels 64 are illustrated as straight and in a generally perpendicular position relative to the supply line 62 and return line 63, however non-linear (e.g., serpentine) and angled orientations are conceived as being within the scope of this disclosure. Supply line 62 and return line 63 can be wider than the general body of cooling plate 60, and thereby prevent height-wise movement of battery cells 51 and foam pads 70.

Returning to FIG. 6, each battery stack 50 can further comprise one or more foam pads 70 disposed between adjacent battery cells 51. Foam pads 70 can absorb kinetic shock (e.g., driving turbulence), and/or accommodate swelling of one or more battery cells 51. As shown each of the four foam pads 70 is exclusive to individual battery stacks 50, however a single foam pad 70 may be common to a plurality of battery cells 51. In some embodiments, cooling plates 60 and foam pads 70 may alternate positions between successive battery cells 51 such that a battery stack 51 can comprise multiples of a battery unit 30 comprising an ordered stack of a battery cell 51, a cooling plate 60, a battery cell 51, and a foam pad 70. A battery stack 50 can comprise one or more battery units 30, and one or more battery units may be partial units. For example, in some embodiments, the end-most elements of a battery stack 50 can comprise battery cells 51 (i.e., a battery cell 51 is contiguous with first endplate 1 and a battery cell is contiguous with second endplate 2). A repeating spacer 20 can correspond to and couple the elements of a complete or partial battery unit 30. Repeating spacers 20 therefore define the compression of the battery cells 51, cooling plates 60, and foam pads 70 associated therewith. Further, the repeating spacers 20 provide thermal insulation and prevent thermal runaway between discrete battery stacks 50.

Figure 8:
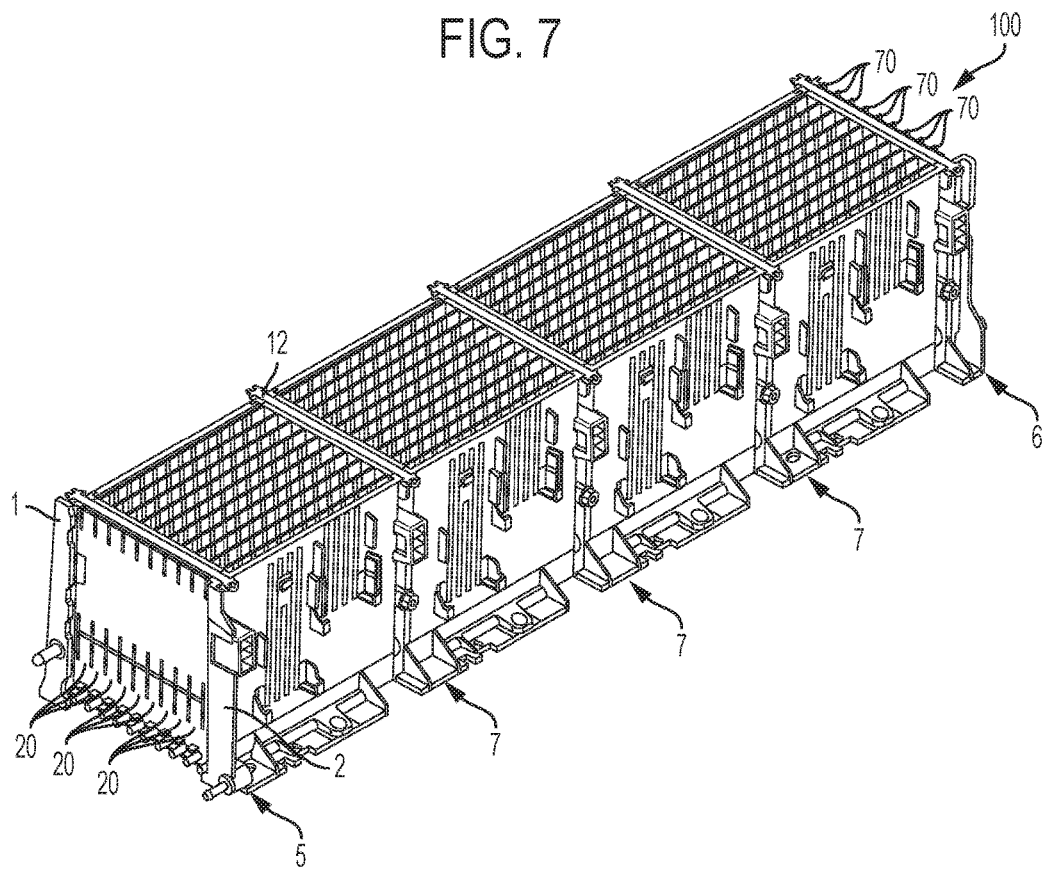
FIG. 8 illustrates a cross-sectional view of a battery section frame, according to one or more embodiments.

FIG. 8 illustrates a cross-sectional view of a battery section frame 100 including the first planar partition 5, the second planar partition 6, and the plurality of middle planar partitions 7 extending between first endplate 1 and second endplate 2. Each of the planar partitions comprise a plurality of repeating spacers 20, and a plurality of cooling plates 60 are incorporated therewith. Each cooling plate 60 is associated with a repeating spacer 20 from each respective planar partition. Optionally, one or both cooling plates 60 positioned closest to first endplate 1 and second endplate 2 may be associated with the respective endplate rather than a repeating spacer. Such a configuration is illustrated in FIG. 6 wherein the cooling plate 60 closest to second endplate 2 is associated with the latter rather than a repeating spacer 20. In other words, cooling plates 60, battery cells 51, and/or foam pads 70 which are proximate the lengthwise ends of battery section 101 and not included in a complete battery unit 30 can correspond to the proximate endplate. In such embodiments, "correspond" can comprise interacting (i.e., mating) with endplate interlocking features 13.

Figure 9:
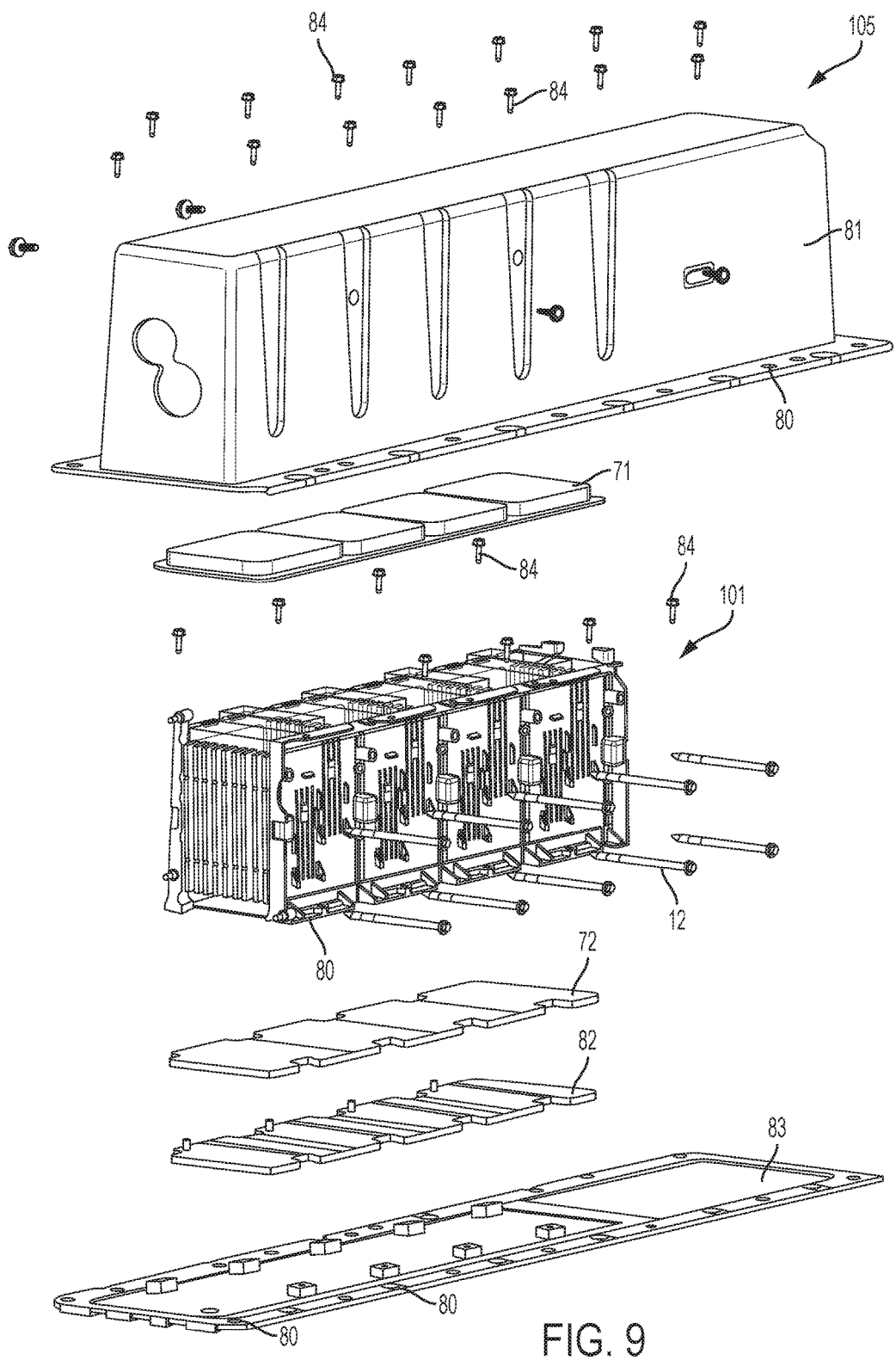
FIG. 9 illustrates an exploded view of a battery pack, according to one or more embodiments.

FIG. 9 illustrates a perspective exploded view of a battery pack 105, comprising battery section 101. A top interconnect board 71 and a bottom interconnect board 72 are configured to attach to the top and bottom faces of battery section 101. Interconnect boards 71 and 72 electrically connect to one or more cell tabs 52 of one or more battery cells 52, and further facilitate electrical connection with a charging source (not shown) and/or a power consumer (e.g., a vehicle drive train, not shown). Interconnect boards 71, 72 are described in co-owned U.S. patent application Ser. No. 15/466,363, for example. A top cover 81 and tray 83 can encase the battery section 101 and interconnect boards 71, 72. Tray 83 may facilitate mounting of the battery pack 105, for example in a vehicle. A bottom cover 82 may be used to electrically isolate interconnect board 27 and/or cell tabs. Mounting features (e.g., apertures) 80 present on top cover 81, tray 83, first endplate 1, and/or second endplate 2 may facilitate the mating of battery pack 105, for example via one or more screws 84.

As mentioned above, first endplate 1, second endplate 2, and the plurality of repeating spacers 20 are polymeric. Accordingly, the polymeric features serve to electrically and optionally thermally insulate of battery stacks 50, and discrete components thereof. Specifically, a repeating spacer 20 can electrically insulate bolts 12 from individual battery cells 51 cooling plates 60, and further insulate individual battery stacks 50. Further, the polymeric materials may be flame resistant plastic, and therefore prevents or inhibits flame propagation between battery cells 51 and cell stacks 50, for example. The polymeric nature of first endplate 1, second endplate 2, and the plurality of repeating spacers 20 further allows for management of battery cell 51 expansion, while providing sufficient structural stability to battery section 101 and reducing weight relative to similar components of metal construction. The polymeric elements may be injected molded, and thus manufacturing is simplified and costs are reduced. Further, injection molding offers the ability to include enhanced features, such as mounting features 80.

As used herein, "polymeric" materials include performance plastics, polymers, and synthetic resins. Such materials may optionally be high strength, low creep, flame retardant, and exhibit low warp. Polymeric materials can include polyamides, such as Polyphthalamide (PPA), Polyarylamide (PAA), Poly[imino(1,6-dioxohexamethylene) iminohexamethylene], and poly(hexano-6-lactam). Other suitable polymeric materials can include acrylonitrile butadiene styrene, polymethyl methacrylate, one or more cycloolefin copolymers, one or more liquid crystal polymers, polyoxymethylene, one or more polyacrylates, polyacrylonitrile, one or more polyamide-imides, one or more polyaryletherketones (e.g., polyetheretherketone, polyetherketoneketone), polybutadiene, polybutylene, polybutylene terephthalate, one or more chlorofluoropolymers (e.g., polychlorotrifluoroethylene), polyethylene terephthalate, polycyclohexylene dimethylene terephthalate, one or more polycarbonates, one or more polyhydroxyalkanoates, one or more polyketones, polyetherimide, one or more polysulfones, one or more polyimides, polyphenylene oxide, polyphenylene sulfide, polypropylene, polyethylene, and combinations or blends thereof. In some embodiments, the polymeric materials can be reinforced by a second material, such as glass fiber, carbon fiber, or resin. In a particular embodiment, the polymeric material can be glass fiber reinforced PAA, and have a tensile strength of approximately 200 MPa and a flexural strength of approximately 331 MPa.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery section comprising:
    a first polymeric endplate;
    a second polymeric endplate substantially planar with the first polymeric endplate;
    a first polymeric planar partition attaching proximate a first end of the first polymeric endplate and a first end of the second polymeric endplate;
    a second polymeric planar partition attaching proximate a second end of the first polymeric endplate and a second end of the second polymeric endplate;
    one or more middle polymeric planar partitions attaching to the first polymeric endplate and the second polymeric endplate between the first polymeric planar partition and the second polymeric planar partition, wherein the first polymeric planar partition, the second polymeric planar partition, and the one or more middle polymeric planar partitions define a plurality of prismatic battery cavities; and
    a plurality of battery cell stacks comprising a plurality of battery cells, each stack occupying one of the prismatic battery cavities, wherein each of the battery cell stacks are disposed substantially planar with the first polymeric endplate and the second polymeric endplate;
    wherein the plurality of polymeric planar partitions each comprises a plurality of polymeric repeating spacers and each of the plurality of polymeric repeating spacers interlocks with two adjacent polymeric repeating spacers, or with an adjacent polymeric repeating spacer and the first polymeric endplate or the second polymeric endplate.

2. The battery section of claim 1, wherein each battery cell stack further comprises one or more cooling plates and/or foam pads disposed between adjacent battery cells.

3. The battery section of claim 2, wherein one or more cooling plates of a plurality of battery cell stacks comprise a single common cooling plate.

4. The battery section of claim 1, further comprising at least one bolt corresponding to each of the plurality of repeating spacers, wherein each of the bolts maintains the first polymeric endplate, the second polymeric endplate, and the corresponding plurality of polymeric repeating spacers in a substantially fixed orientation.

5. The battery section of claim 1, wherein each of the polymeric repeating spacers of a planar partition comprise a plurality of aligned apertures, and a plurality of corresponding bolts occupy the aligned apertures and secure the polymeric repeating spacers to the first polymeric endplate and the second polymeric endplate.

6. The battery section of claim 1, wherein each of the plurality of polymeric repeating spacers correspond to a complete or partial battery unit, wherein a complete battery unit comprises an ordered stack of a first battery cell, a cooling plate, a second battery cell, and a foam pad.

7. The battery section of claim 1, wherein the first polymeric endplate, the second polymeric endplate, and the plurality of polymeric planar partitions comprise polyphthalamide, polyarylamide, Poly[imino(1,6-dioxohexamethylene) iminohexamethylene], or poly(hexano-6-lactam).

8. The battery section of claim 1, wherein the first polymeric endplate, the second polymeric endplate, and the plurality of polymeric planar partitions polyphthalamide, polyarylamide, poly[imino(1,6-dioxohexamethylene) iminohexamethylene], poly(hexano-6-lactam), acrylonitrile butadiene styrene, polymethyl methacrylate, one or more cycloolefin copolymers, one or more liquid crystal polymers, polyoxymethylene, one or more polyacrylates, polyacrylonitrile, one or more polyamide-imides, one or more polyaryletherketones (e.g., polyetheretherketone, polyetherketoneketone), polybutadiene, polybutylene, polybutylene terephthalate, one or more chlorofluoropolymers (e.g., polychlorotrifluoroethylene), polyethylene terephthalate, polycyclohexylene dimethylene terephthalate, one or more polycarbonates, one or more polyhydroxyalkanoates, one or more polyketones, polyetherimide, one or more polysulfones, one or more polyimides, polyphenylene oxide, polyphenylene sulfide, polypropylene, and/or polyethylene.

9. The battery section of claim 1, wherein the first polymeric endplate, the second polymeric endplate, and the plurality of polymeric planar partitions comprise a polyamide material.

10. The battery section of claim 1, wherein the first polymeric endplate, the second polymeric endplate, and the plurality of polymeric planar partitions comprise a polymer reinforced with one or more of glass fiber, carbon fiber, or resin.

11. The battery section of claim 1, wherein the battery section powers a vehicle.

* * * * *